Feb. 4, 1936.  F. APPELBERG  2,029,805
SHAKING CONVEYER
Filed Aug. 9, 1934
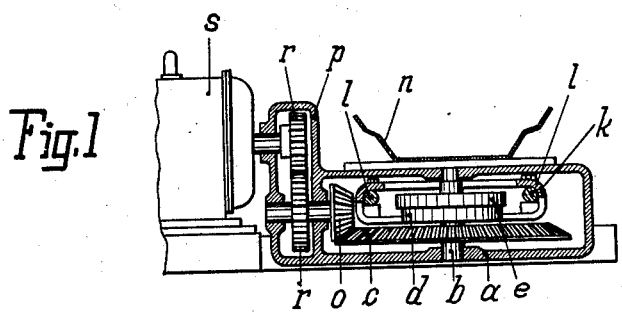
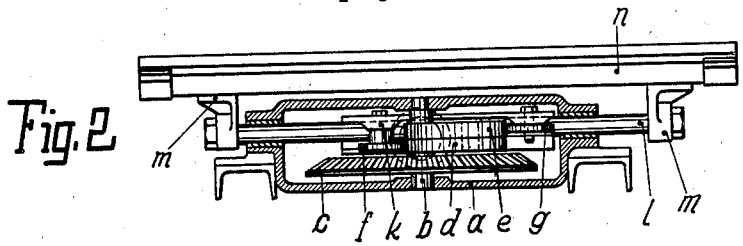
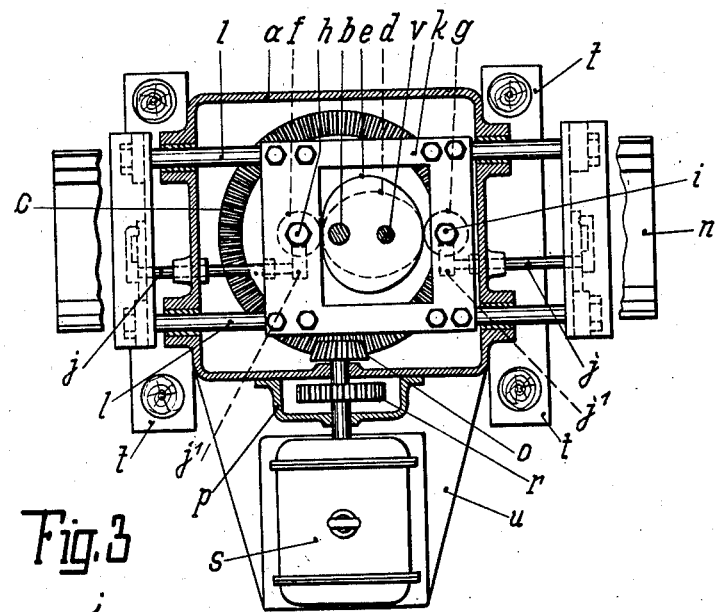
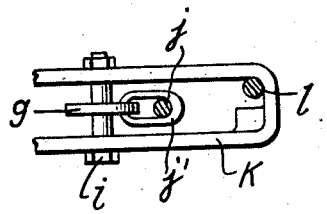
INVENTOR
Friedrich Appelberg
BY
Bailey & Larson
ATTORNEYS Patented Feb. 4, 1936

2,029,805

UNITED STATES PATENT OFFICE 2,029,805

SHAKING CONVEYER

Friedrich Appelberg, Bochum, Germany, assignor to Gebrueder Eickhoff, Maschinenfabrik und Eisengiesserei, Bochum, Germany Application August 9, 1934, Serial No. 739,190
In Germany August 24, 1933

8 Claims. (Cl. 198—220)

The invention relates to shaking conveyers and has in particular reference to the driving means for such class of conveyer. The invention has for its object so to construct and arrange the gearing of shaking conveyer that it can be lodged in a low casing extending transversely of the conveyer and closed on all sides, and that the gearing can be rigidly connected to the conveyer. In order to obtain a lowest possible casing above which the conveyer can be disposed at the lowest possible level, cam disks are made use of for the conversion of the rotary motion supplied by the driving motor into the reciprocating motion of the shaking conveyer, these cam disks revolving within a transmission member connected to the conveyer. The use of a gearing of such design is known per se. In the known gearings of this kind, however, the cam disks revolve in vertical planes and a frame that transmits the motion to the conveyer is directly connected to the latter. Consequently, this gearing suffers from a comparatively great structural height which results from the diameter of the cam disks. In addition, owing to the transmission frame being directly connected to the conveyer, it is not possible without further ado to enclose the casing in air-tight manner.

The invention has now for its object to overcome these drawbacks. In contrast to the known design outlined above, according to the invention a very low structural height of the gearing and, consequently, also of the surrounding casing is obtained by the cam disks being disposed horizontally and revolving on a vertical axis, while the member which is moved by the disks and transmits the motion to the conveyer is arranged parallel to them.

Furthermore, in order to obtain that the members of the transmission gear interposed between the driving motor and the cam disks as little as possible influence the structural height of the gearing, the invention further provides that the cam disks are mounted on a common shaft together with a bevel wheel which is a member of the transmission gear, and that the remaining parts of the latter are disposed laterally of this bevel wheel and of the transmission member or frame that co-operates with the cam disks, while the driving motor in turn is mounted adjacent to and laterally of the transmission gear. In such a construction the casing advantageously is made of angular shape, seen in the direction transversely of the direction of the conveyer, the horizontal leg of the casing enclosing the great bevel wheel together with the cam disks disposed above it and the transmission member or frame, as well as the small companion bevel wheel, whilst the adjoining short vertical leg of the casing contains the remaining parts of the transmission gear. In order to save space for the mounting of the shaft carrying the cam disks and the great bevel wheel, the invention further provides to mount the said shaft in the bottom wall and cover of the casing.

Finally, in order to obtain a rigid connection between the transmission frame and the conveyer, that means, a connection which is free from any hinges or joints, and to have the gearing enclosed entirely tightly in the casing, the transmission body or frame is connected to the conveyer by a system of transmission bars that pass through and are packed dust-proof in, the walls of the casing.

In order that the invention may be clearly understood and readily carried into effect, an embodiment of gearing for the purpose set forth is illustrated by way of example in the accompanying drawing in which Figure 1 is a vertical section transversely of the longitudinal direction of the conveyer, Figure 2 is a vertical section in the longitudinal direction of the conveyer, and Figure 3 is a top view thereof, partly in horizontal section.

Figure 4 shows a detail in a greater scale.

The conveyer gearing comprises two cam disks $d$ and $e$ and a transmission member $k$ of frame-like shape, which by means of rollers $f$ and $g$ mounted on journals $h$ and $i$ abuts against the cam disks and thus is in permanent positive contact therewith. The two cam disks $d$ and $e$ and the frame $k$ are disposed above and parallel to, a great bevel wheel $c$, a common vertical shaft $b$ carrying both the bevel wheel $c$ and the two cam disks. The latter further are connected to the bevel wheel $c$ by a pin $v$, see Figure 3.

The bevel wheel $c$ receives its drive by a companion wheel or pinion $o$ through gear wheels $r, r$ from the driving motor $s$. This motor may be an electric motor or a compressed air-driven motor. The whole gearing is lodged in a casing $a$ which is closed on all sides and comprises a low horizontal portion extending transversely of and below the conveyer $n$, and a lateral vertical portion $p$ which is somewhat higher, and is situated on the side of the conveyer. The flat horizontal portion now contains the bevel wheel $c$ together with the two cam disks $d$ and $e$, the frame $k$ and the pinion $o$, whilst the transmission gear $r, r$ is enclosed in the lateral casing portion. Adjacent to this latter is mounted the driving motor s. In this manner it is possible to keep the total structural height of the gearing so low that the maximm height of the latter and that of the motor is not greater or only slightly greater than the height of the shaking conveyer, when normally charged and mounted at the customary level. Consequently, the present conveyer is capable of being mounted and used still in very low seams.

The frame k has fixed to it in the longitudinal direction of the conveyer two bars l, l which are mounted airtightly in the casing and are connected to the conveyer trough n by means of angular transverse brackets m. In this manner the driving power is transmitted to the conveyer trough centrally below the latter.

Out of the rollers f, g that are in contact with the cam disks d, e, the roller g, which takes up the great retardation forces occurring at the end of the forward motion of the conveyer, is disposed advantageously at least approximately at the level of the bars l, so that the guide forces that occur on this place remain as small as possible. In order, further, to obtain an inversion of the conveying direction by means of the rollers f and g, the rollers may be provided with different hub projections corresponding to their different level, so that they may be interchanged relatively to the cam disks, whereby inverse conveying direction is obtained. It is further possible to provide to this end a suitable lever mechanism j, j' by which the level of the rollers f and g is altered from outside, so that the conveying direction can be altered without that the casing is opened.

Lateral lugs t may be provided on the bottom of the casing on which may rest mining props which hold the conveyer in position. Finally, a lateral bed plate u may be provided on the casing, which carries the driving motor s.

What I claim as my invention is:—

1. A shaking conveyer comprising a prime mover, a vertical shaft adapted to be driven thereby, two cam disks rigid to said shaft, a member co-operable with said cam disks and adapted to transmit their rotary motion to the conveyer trough as reciprocating motion, antifriction rollers interposed between said cam disks and transmitting members and adapted to be interchanged relatively to said cam disks in order to obtain inversion of the conveying direction, a flat casing closed on all sides and extending transversely of and below said conveyer trough, said vertical shaft, cam disks and said transmitting member with its antifriction rollers being lodged in said casing.

2. In a shaking conveyer comprising a prime mover, a vertical shaft adapted to be driven thereby, two cam disks rigid with said shaft, a follower, a pair of parallel transmission bars attached thereto, said follower being cooperable with said cam disks and adapted to transmit their rotary motion to the conveyer trough through said follower and said transmission bars as reciprocating motion and means for connecting said follower to said cam disks, at least one of said cam disks and one of said means lying in the same plane as said transmission bars, a flat casing closed on all sides and extending transversely of and below said conveyer trough, said vertical shaft, cam disks and said follower being lodged in said casing.

3. In a shaking conveyer having a trough, means to drive the conveyer comprising a prime mover, a vertical shaft adapted to be driven thereby, two cam disks rigid with said shaft, a follower, a pair of parallel transmission bars attached thereto, said follower being, cooperable with said cam disks and adapted to transmit their rotary motion to the conveyer trough through said follower and said bars as reciprocating motion, and means at opposite sides of said follower for connecting the latter to said cam disks, at least one of said cam disks and one of said means lying in the same plane as said transmission bars, whereby one of said cam disks effects motion of said follower in one direction and the other of said cam disks effects motion of said follower in the opposite direction.

4. In a shaking conveyer having a trough, means to drive the conveyer comprising a prime mover, a vertical shaft adapted to be driven thereby, two cam disks rigid with said shaft, a follower, a pair of parallel transmission bars attached thereto, said follower being cooperable with said cam disks and adapted to transmit their rotary motion to the conveyer trough through said follower and said bars as reciprocating motion and means at opposite sides of said follower for connecting the latter to said cam disks, at least one of said cam disks and one of said means lying in the same plane as said transmission bars, one of said means being cooperable with one of said cam disks and the other of said means being cooperable with the other of said cam disks whereby one of said cam disks effects motion of said follower in one direction and the other of said cam disks effects motion of said follower in the opposite direction.

5. In a shaking conveyer having a trough, means to drive the conveyer comprising a prime mover, a vertical shaft adapted to be driven thereby, two cam disks rigid with said shaft, a follower connected to said trough cooperable with said cam disks and adapted to transmit their rotary motion to the conveyer trough through said follower as reciprocating motion and means at opposite sides of said follower for connecting the latter to said cam disks, one of said means being cooperable with one of said cam disks and the other of said means being cooperable with the other of said cam disks, said means being interchangeable, whereby each of said means may be engaged with either of said cam disks so that inversion of the direction of motion may be effected.

6. In a shaking conveyer having a trough, means to drive the conveyer comprising a prime mover, a vertical shaft adapted to be driven thereby, two cam disks rigid with said shaft, a follower connected to said trough cooperable with said cam disks and adapted to transmit their rotary motion to the conveyer trough through said follower as reciprocating motion and means for connecting said follower to said cam disks interchangeably to cause inversion of the reciprocating motion, a flat casing closed on all sides and extending transversely of and below said conveyer trough, said vertical shaft, cam disks and said follower being lodged in said casing, said shaft being mounted in the bottom and top wall of the latter.

7. In a shaking conveyer having a trough, means to drive the conveyer comprising a prime mover, a vertical shaft adapted to be driven thereby, two cam disks rigid with said shaft, a follower cooperable with said cam disks and adapted to trnsmit their rotary motion to the conveyer trough through said follower as reciprocating motion and means for connecting said follower to said cam disks interchangeably to cause inversion of the reciprocating motion, transmission bars interposed between said follower and said conveyer trough, a flat casing closed on all sides and extending transversely of and below said conveyer trough, said vertical shaft, cam disks and said follower being lodged in said casing, said bars being guided in the latter.

8. In a shaking conveyer having a trough, means to drive the conveyer comprising a prime mover, a vertical shaft adapted to be driven thereby, two cam disks rigid with said shaft, a member connected to said trough cooperable with said cam disks and adapted to transmit their rotary motion to the conveyer trough as reciprocating motion, antifriction rollers interposed between said cam disks and transmitting members said rollers being adapted to be interchanged relatively to said cam disks in order to obtain inversion of the conveying direction, transmission bars interposed between said member and said conveyer trough, a flat casing closed on all sides and extending transversely of and below said conveyer trough, said vertical shaft, cam disks and said transmitting member with its antifriction rollers being lodged in said casing, said bars being guided in the latter.

FRIEDRICH APPELBERG.